June 13, 1972    J. R. BESSON ET AL    3,669,549
OPTO-ELECTRONIC DEVICE FOR THE REMOTE MEASUREMENT OF THE SHIFTS OF A MOVABLE OBJECT
Filed June 18, 1970                5 Sheets-Sheet 1
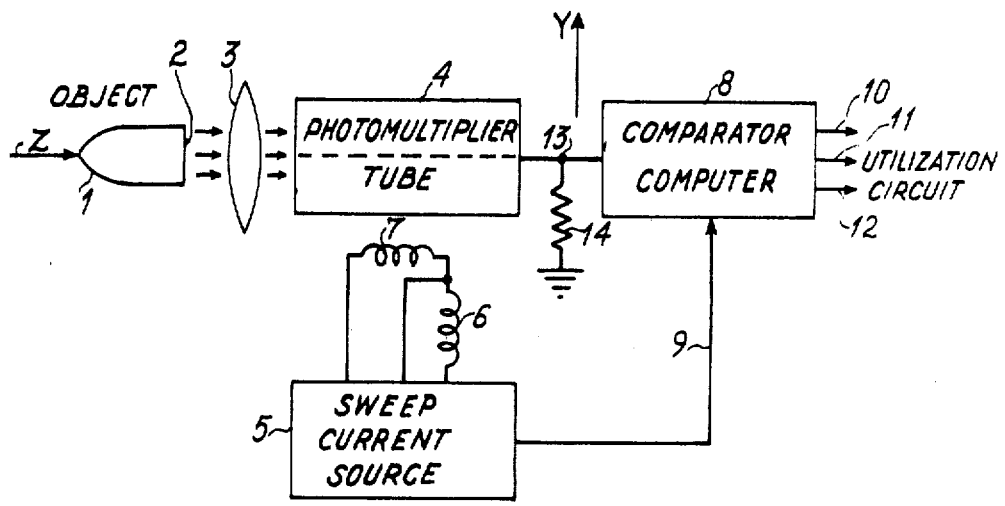
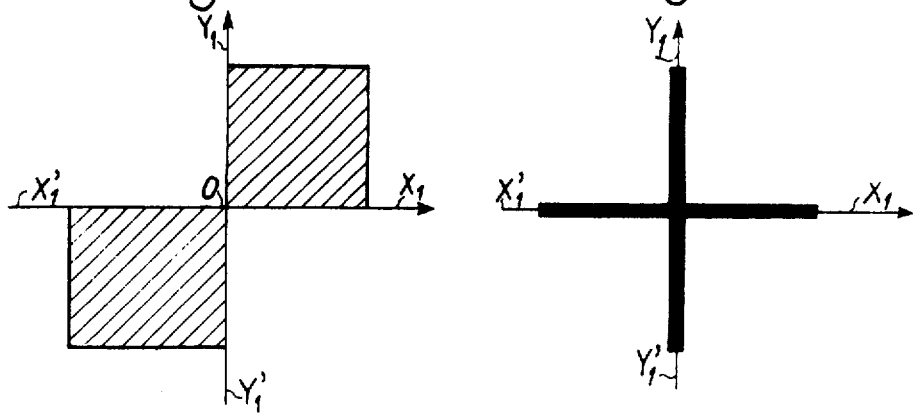
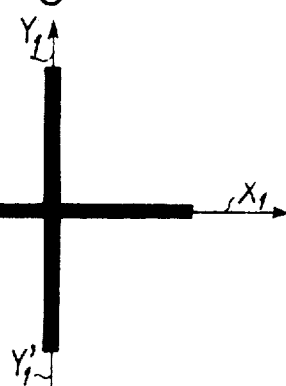
INVENTORS:
Jean R. BESSON,
Joseph F. CUMER and
Roland J. HOARAU
By Abraham A. Saffitz
ATTORNEY

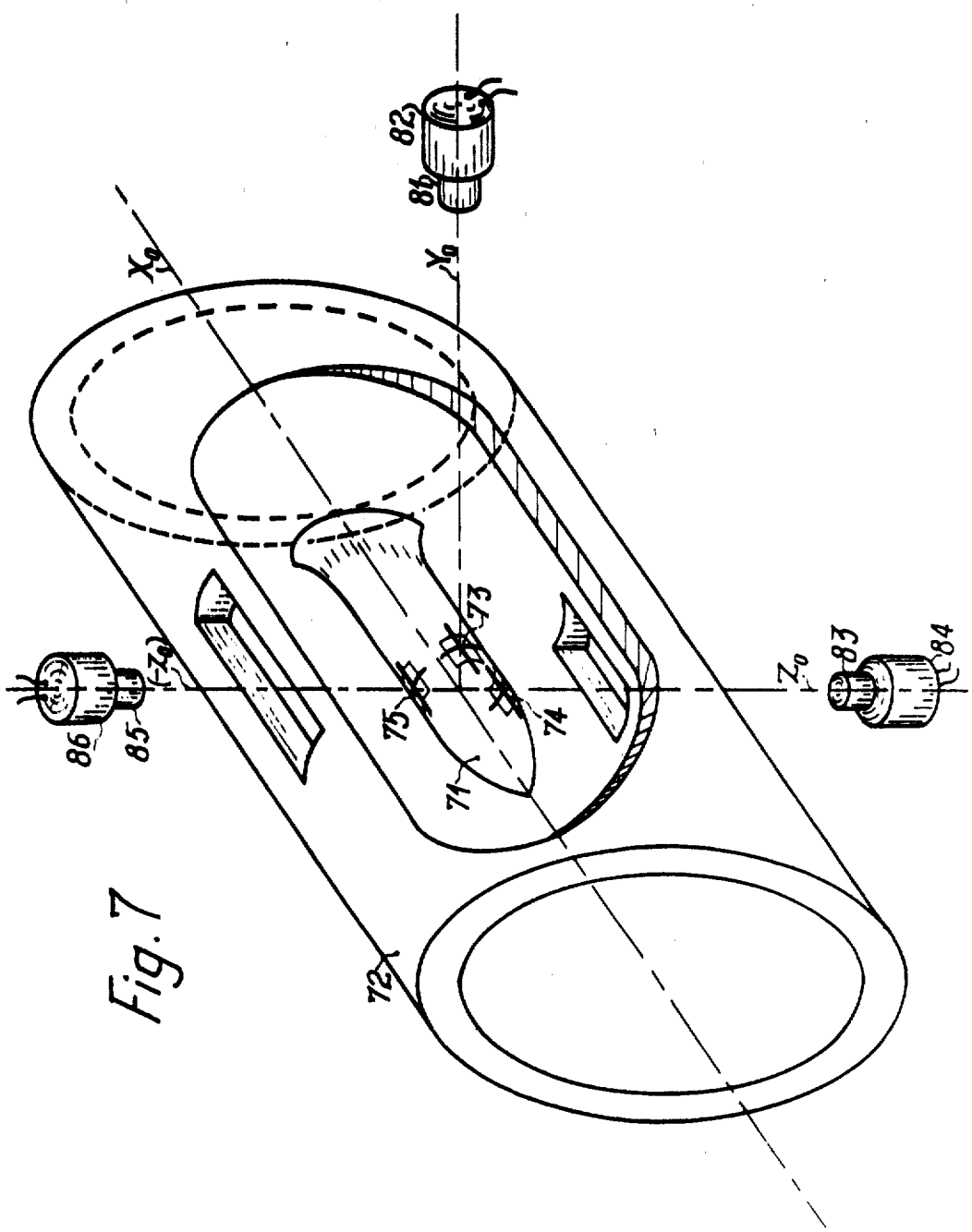

United States Patent Office

3,669,549
Patented June 13, 1972

3,669,549
OPTO-ELECTRONIC DEVICE FOR THE REMOTE MEASUREMENT OF THE SHIFTS OF A MOVABLE OBJECT
Jean R. Besson, Boulogne, Joseph F. Cumer, Paris, and Roland J. Hoarau, L'Hay-les-Roses, France, assignors to Office National d'Etudes et de Recherches Aerospatiales, Chatillon-Sous-Bagneux, France
Filed June 18, 1970, Ser. No. 47,332
Claims priority, appplication France, June 20, 1969, 6920825
Int. Cl. G01b *11/26*
U.S. Cl. 356—152
4 Claims

ABSTRACT OF THE DISCLOSURE

Apparatus for distant measuring of the displacement about a fixed reference position of a solid object carrying at least one optical sighting mark, comprising opto-electronic devices each including a photomultiplier tube and each having a main sighting axis, a conductive target in each one of said devices on which an electronic image of said object is formed, means for causing an electron beam to periodically scan said target, a small aperture in said target letting through a thin electron beam, means for amplifying the current of said beam, means for deriving from said amplified current an electric signal, and computer means for combining the signals delivered by all of said devices into other signals representing the components of said displacement in a three-dimensional coordinate system.

---

The present invention relates to a new opto-electronic device for the remote determination and measurement of the shifts of a movable object relatively to a fixed reference position, this device supplying electrical signals representing the various parameters representing these shifts.

In a known manner, the invention employs one or more optical figures having luminous parts and obscure parts, for example respectively white and black parts, carried by the surface of the object whose shifts it is desired to measure. These figures will be designated hereinunder the name of "sighting marks."

Also in a known manner, a device in accordance with the invention uses means for forming the optical image of the sighting mark or of each of the said sighting marks on the photocathode of a corresponding phototube, this tube comprising electronic and optical means for deriving from the said optical image an electronic image formed on a target or electrically conductive screen provided with an aperture through which there can pass narrow elementary electron beams forming part of the whole of the beams which fall on the said screen to form there the said electronic image. The intensity of this elementary beam depends on the electronic flux falling on the screen at the location of the aperture, and accordingly upon the luminosity of the optical image at the point thereof, the electronic image of which is formed at the said location. The electrical current carried by the said elementary beam is amplified by the amplifying part of the phototube and collected on an output electrode of the said phototube, forming at the terminals of a utilization circuit connected to the said electrode an electrical signal whose amplitude depends on the intensity of the said current.

Still in a known manner, the electronic image is scanned by subjecting the whole of the said electron beam to the action of appropriate deflecting means, thereby shifting the electronic image with respect to the screen aperture which is equivalent to scanning the said image by an aperture endowed with a scanning motion.

Devices implementing the principles stated above have been described, for example, in French Pat. No. 1,501,457 applied for on Nov. 22, 1966. In these devices the object whose shifts it is desired to study carries sighting marks having alternate black and white parts, and the scanning of the electronic image is effected by applying alternately and periodically to the whole of the electron beams two scanning motions respectively in one and the other of two rectangular directions parallel to the plane of the screen, which plane is itself substantially perpendicular to the mean direction of the total beam in its position of rest. During each scanning period, the time difference between a fixed reference instant of this period and the instant at which there occurs a sudden change in the amplitude of the signal picked up in the utilization circuit connected to the output electrode of the phototube is measured and the variation of said time difference versus time constitutes a measurement of the shift of the electronic image and accordingly of the shift of the optical image, with regard to a fixed reference point. The time difference variations associated with the two aforesaid scanning motions respectively measure the translation shifts of the object with regard to the said reference point, respectively measured in one and the other of two corresponding rectangular directions, for example horizontal and vertical, both perpendicular to a horizontal reference direction constituting the general axis of the arrangement.

This system of the prior art allows one to measure translation shifts of the object but not rotation shifts thereof.

When one wishes to study the shifts of a solid object as a function of forces applied thereto, for example aerodynamic forces, it can be advantageous to fix the reference position of this object not by mechanical bonds, but by magnetic suspension. Means for providing such a magnetic suspension are described for example in French Pat. No. 1,104,494 dated May 11, 1954 and in the patents of addition thereto Nos. 70,314 and 72,054 dated Apr. 21, 1955 and June 7, 1957. It is known that it is also possible to control the magnetic suspension means employed by signals measuring the shifts of the object with regard to a fixed position, so as to make it automatically return to said position.

The device of the present invention improves on the known devices in that it makes it possible to measure the shifts of the object both through rotation and through translation, each optical sighting mark supplying information relating to three co-ordinate changes, two of which represent translations and the third a rotation. It will be seen hereinafter that it is also possible, by means of three optical sighting marks and three corresponding electro-optical devices to obtain the measurements of three co-ordinates of translation and of three angles of rotation, defining completely the various possible shifts in space of an object having six degrees of freedom.

In the following it will be essentially assumed that the considered shifts—translations and rotations—are of a comparatively small amplitude on either side of a reference position in which three right-angled axes rigidly defined with respect to the object coincide respectively with three fixed axes in the space defined with respect to the measurement device. Among these last three axes, one of them, hereinafter called the "axis of sight" plays the part of main axis of the system and will be called later on "axis Z," whilst the other two will be called "axis X" and "axis Y."

In accordance with the present invention, there is provided an equipment for measuring the shifts of a solid object about a fixed reference position, the said solid object carrying at least one optical sighting mark comprising parts of strong illumination and parts of weak or zero illumination, the said equipment comprising at least one electro-optical measuring device having a main axis of sight Z, the said device comprising optical means for forming the optical image of the said sighting mark on the photocathode of a phototube, the said tube including an electronic optical system forming on a conductive screen situated substantially in a plane perpendicular to the said axis Z the electronic image of the said optical image, an aperture in the said screen allowing a thin electron beam to pass therethrough and an output electrode receiving the current of the said beam, a utilization circuit connected to the said output electrode and forming, from the said current, an electrical signal, and means for processing the said signal to derive therefrom other signals representing the measurements of the shifts through translation and through rotation of two rectangular axes connected to the said solid object relatively to two reference rectangular axes X and Y fixed in space and perpendicular to the said axis Z; the said device comprising furthermore periodic scanning means applied to the whole electron beam guided by the said electronic optical system and impinging on the said screen, in order to cause the said whole beam to be periodically deflected in one and the other of two mutually perpendicular directions situated in a plane parallel to the said axes X and Y, and means comprised in the said processing means and driven in synchronism with said scanning means for time-analyzing the said electrical signal; the said device being characterized in that the said scanning means are so arranged as to cause the said whole beam to describe periodically in the same plane parallel to the said axes X and Y a closed curve.

In accordance with one preferred embodiment of the invention, the said closed curve is a rectangle and preferably a square, and the said scanning means consist of two coils supplying orthogonal magnetic fields, each of the said coils being fed during each of the four quarters of a scanning period, successively by a current having a waveform comprising ascending and descending portions separated by maximum and minimum constant portions and the respective feeds of the two coils being phase-shifted by a quarter of the said period.

In an important application of the invention, the solid object whose possible movements having six degrees of freedom carries three sighting marks respectively associated with three corresponding measuring devices and one combines the electrical signals processed by these devices in order to obtain other signals representing the parameters defining the instantaneous position of the said object or driving a mechanism for controlling the said position by the said other signals.

The invention will be better understood by reading the detailed description given hereinafter of certain exemplified embodiments and with the aid of the attached drawings, in which:

FIG. 1 is a block diagram of a device in accordance with the invention;

FIGS. 2 and 3 show examples of optical sighting marks carried by the object whose shifts it is desired to measure;

FIG. 7 is a perspective view showing the application of the system of the invention to a movable object having six degrees of freedom and provided with three sighting marks respectively associated with three sighting axes.

Figure 4:
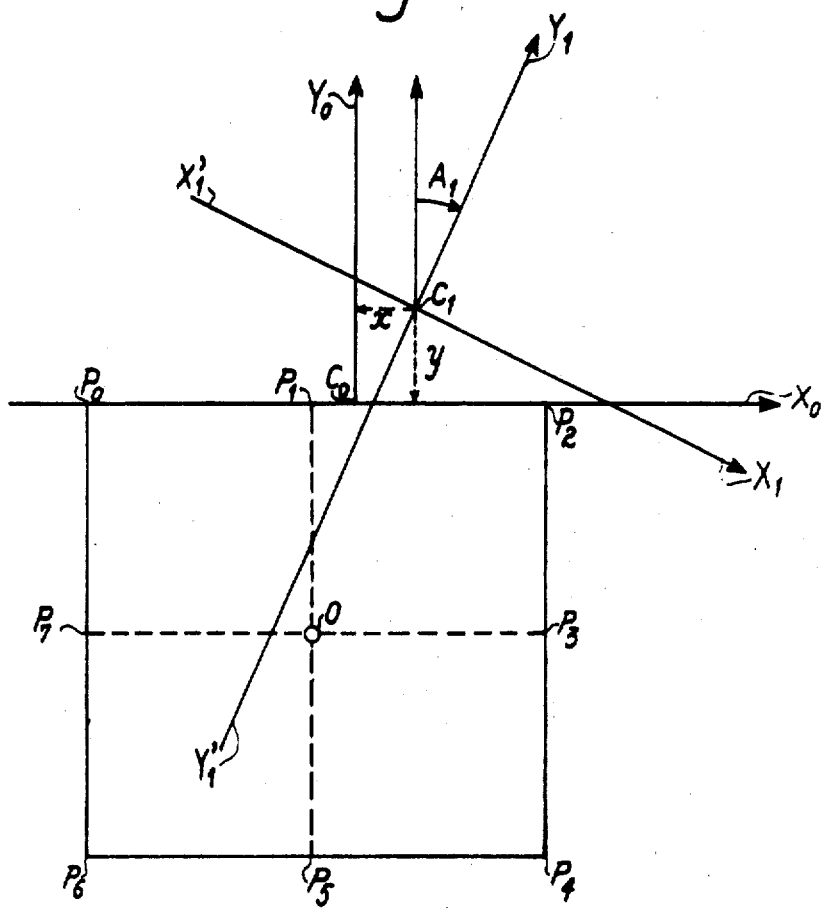
FIG. 4 is a diagram showing the path covered in the course of the scan by the electronic image of the optical sighting mark, relatively to the central aperture of the target and serving to establish the formulae connecting the parameters of the movement of the object to the time position of the pulses produced by the measurement apparatus.

Referring first of all to FIG. 1, one can see the object 1 whose shifts it is desired to measure. The sighting axis of the installation is represented by the direction Z and is normally, in the position of rest of the object 1, a general axis common to this object, to the optical system 3 (symbolically indicated by a lens) and to the phototube 4.

The object 1 carries on a substantially plane face which, in the position of rest, is perpendicular to the axis Z, therefore to the plane of FIG. 1, a sighting mark 2 whose appearance, seen in the direction Z, is represented in FIG. 2. This sighting mark comprises two axes $X_1$ and $Y_1$ perpendicular one to the other and which, in the position of rest of the object 1, coincide with two fixed axes X and Y perpendicular one to the other and whose plane is perpendicular to the direction Z of FIG. 1. It can be assumed, for example, that the axis X is perpendicular to the plane of FIG. 1, the axis Y being directed in the plane of this very figure.

FIG. 2 shows a preferred embodiment of the sighting mark 2, formed by two black quadrants and by two white quadrants, alternate and delimited by the axes $X_1$ and $Y_1$.

FIG 3 shows another embodiment of the sighting mark carried by the object 1 formed by two perpendicular narrow black streaks, on a white background. One could just as well assume that the sighting mark is formed by two perpendicular white streaks on a black background.

In the device of FIG. 1, the optical image of the sighting mark 2 is formed by the optical system 3 on the photocathode of a photomultiplier tube 4. As has already been mentioned, an appropriate electronic optical system forms on a conductive target contained in 4 an electronic image reproducing the said optical image. This target carries an aperture of small dimensions, preferably central. Under the action of the scanning currents passing through the deflecting coils 6 and 7 coupled inductively to the tube 4 and fed by the source 5 of scanning signals, the whole electron beam forming the electronic image in the tube 4 is alternately deflected in the X-direction and in the Y-direction. There is therefore a shift of the electronic image with regard to the target. Accordingly, the passages of the aperture of the target from a "white" zone of the image to a "black" zone of this latter, which result in sudden variation in the current received by the output electrode 13 of the tube 4, take place at times conditioned on the one hand by the scan, and on the other hand by the shift of the object 1 with regard to its position of rest, if such a shift exists.

The comparator 8 receives on the one hand the electrical voltage developed across the impedance 14 by the output current of the phototube at 13, on the other hand through lead 9 comparison signals generated directly by the scanning source 5 or processed from this latter. These signals occur at fixed times within each scanning period. On the other hand the signals at output 13 occur, relatively to the comparison signals, at times variable according to the shift of the electronic image and accordingly according to the shift of the optical image of the sighting mark 2 and of the object 1. The signals resulting from the comparison appear at the output terminals 10, 11, 12 of the comparator 8 and, if need be after a suitable processing, are directed towards a utilization circuit.

With reference to FIG. 4, $X_0$ and $Y_0$ designate the right-angled axes of fixed direction, parallel to X and Y, and connected to the electronic image of the sighting mark formed on the target, O designates the central aperture of the target, $P_0$, $P_2$, $P_4$, $P_6$ the apices of a square having O as its center, and $2b$ the side of this square. The axes $X_0$ and $Y_0$ intersect at the point $C_0$ which, if the sighting mark is in its reference position, shifts with a constant speed on the perimeter of the square. If the sighting mark is shifted with regard to the reference position, the point $C_0$ comes to $C_1$ and the axes $X_0$ and $Y_0$ respectively to $X'_1X_1$ and $Y'_1Y_1$. The shift is characterized by the rectangular co-ordinates $x$ and $y$ of $C_1$ with regard to the axes $X_0$ and $Y_0$, and by the angle $A_1$ between $X'_1X_1$ and $X_0$.

Designating by $P_1$, $P_3$, $P_5$, $P_7$ the centers of the sides of the square $P_0$, $P_2$, $P_4$, $P_6$; by T and the period of one complete scan all round this square; and by $t_0$ the instant, at which in the absence of shift of the sighting mark, the point $C_0$ passes through the position $P_0$, it can easily be seen, assuming to be "black" the quadrants comprised on the one hand between $X_1$ and $Y_1$, on the other hand between $X'_1$ and $Y'_1$, the other two quadrants being presumed to be "white," that the aperture O passes from a "white" zone to a "black" zone (or vice versa) in the following conditions:

At the instant $$t_1 = t_0 + \frac{T}{8}$$

(for $C_0$ a $P_1$) from the white to the black.
At the instant $$t_3 = t_0 + \frac{3T}{8}$$

(for $C_0$ at $P_3$) from the black to the white.
At the instant $$t_5 = t_0 + \frac{5T}{8}$$

(for $C_0$ at $P_5$) from the white to the black.
At the instant $$t_7 = t_0 + \frac{7T}{8}$$

(for $C_0$ at $P_7$) from the black to the white.

In other words, the current at the output 13 of the phototube 4 (FIG. 1) passes at the instants in question from a constant maximum value $I_0$ to a minimum value or vice versa.

If now the sighting mark has undergone the shift represented by the quantities $x$, $y$, $A_1$ defined above, it can be seen by a simple calculation that the corresponding passages take place respectively at the instants:

$$t'_1 = t_1 + \frac{T}{8}\left(\frac{y \tan A_1 - x}{1} + \tan A_1\right)$$

$$t'_3 = t_3 + \frac{T}{8}\left(\frac{x \tan A_1 + y}{1} + \tan A_1\right)$$

$$t'_5 = t_5 + \frac{T}{8}\left(\frac{x - y \tan A_1}{1} + \tan A_1\right)$$

$$t'_7 = t_7 + \frac{T}{8}\left(\frac{x \tan A_1 + y}{1} + \tan A_1\right) \quad (1)$$

On the other hand, it is well evident, in accordance with FIG. 4, that at the fixed instants $t_0$, $t_2$, $t_4$ and $t_6$ corresponding respectively to the passages of center $C_0$ of the unshifted image through the points $P_0$, $P_2$, $P_4$ and $P_6$, the aperture is lying respectively in white, black, white and black regions.

One can therefore write:

$$t'_1 - t_0 = \frac{T}{8}\left(1 + \frac{y \tan A_1 - x}{1} + \tan A_1\right) = \frac{T}{8}(1+a)$$

$$t_5 - t'_3 = \frac{T}{8}\left(1 - \frac{x \tan A_1 + y}{1} - \tan A_1\right) = \frac{T}{8}(1+b)$$

$$t_6 - t'_5 = \frac{T}{8}\left(1 + \frac{y \tan A_1 - x}{1} - \tan A_1\right) = \frac{T}{8}(1+c)$$

$$t'_7 - t_6 = \frac{T}{8}\left(1 - \frac{x \tan A_1 + y}{1} + \tan A_1\right) = \frac{T}{8}(1+d) \quad (2)$$

If therefore voltages $V_a$, $V_b$, $V_c$, $V_d$ of respective amplitudes proportional to the quantities $(1+a)$, $(1+b)$, $(1+c)$ and $(1+d)$ can be obtained, it will be possible, through the resolution by an analog computer of the system (2), to obtain the quantities $x$, $y$ and $\tan A_1$.

It can be seen furthermore that:

$$\tan A_1 = (d-b)/21 \quad (3)$$

and that the four quantities $a$, $b$, $c$, $d$ are not independent, being connected by the relation:

$$(a+b) = (c+d)$$

Before describing an analog computer allowing one to determine the values of $x$, $y$ and $\tan A_1$ from those of electric voltages $V_a$, $V_b$, $V_c$, $V_d$ proportional to $(1+a)$, $(1+b)$, $(1+c)$, $(1+d)$ one will first show how these voltages can be obtained.

Figure 5:
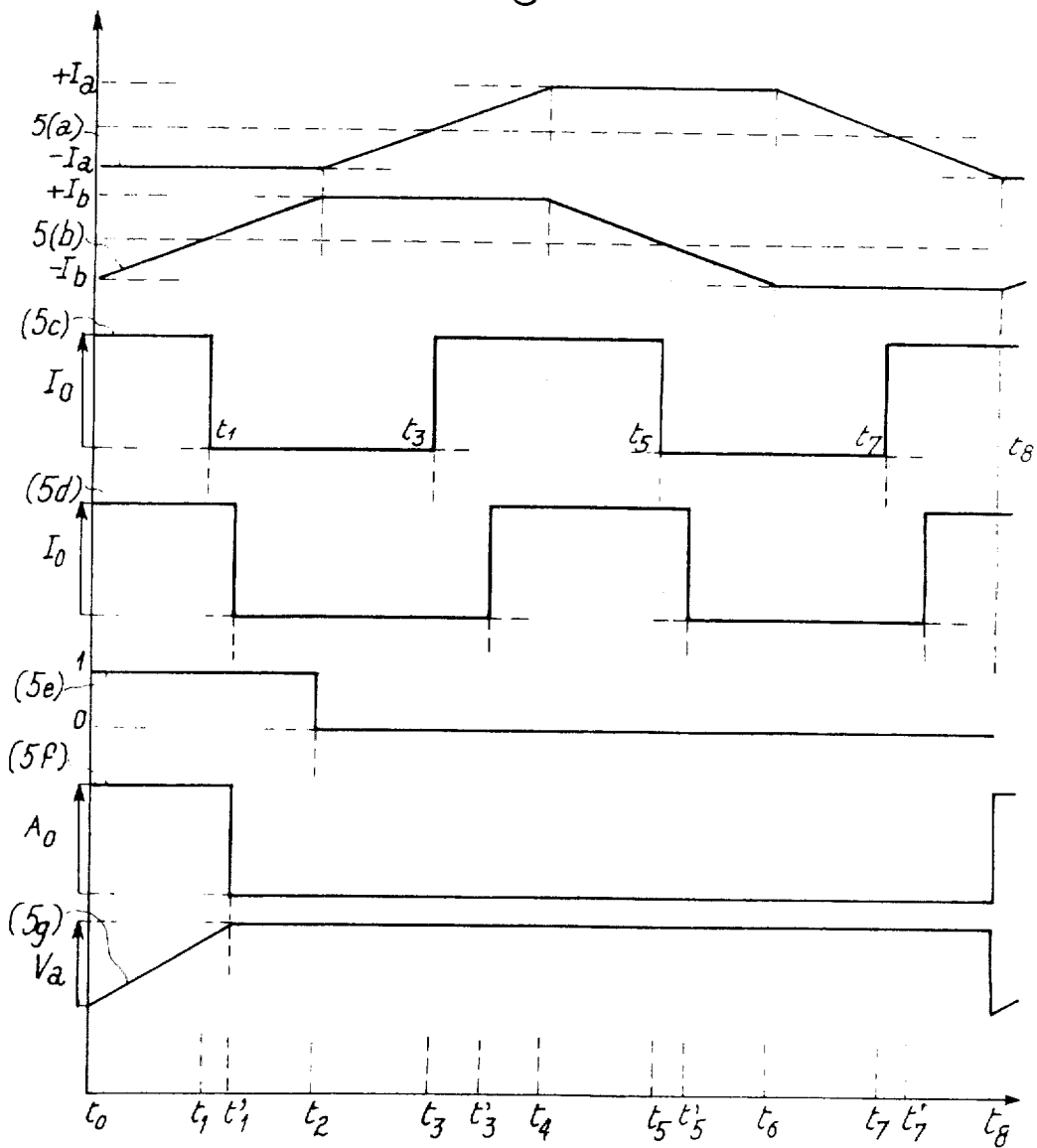
FIG. 5 is a waveform diagram showing the signals at different points of the device.

FIG. 5 represents, as a function of time $t$ and in the course of one scan period T, the waveforms of the different signals happening in the functioning of the device of FIG. 1. In FIG. 5 the period T begins at the instant $t_0$, is divided into eight equal parts by the instants $t_1$, $t_2$, $t_3$, $t_4$, $t_5$, $t_6$, $t_7$ and terminates at the instant $t_8$. At (5a) and (5b) there are respectively represented as time functions, the currents through the "vertical" 6 and "horizontal" 7 deflecting coils of FIG. 1. As can be seen, these currents vary linearly from a negative maximum intensity $-I_a$ or $-I_b$ to an equal positive maximum intensity $+I_a$ or $+I_b$ in a quarter of period, and afterwards conversely, the intervals of time during which these variations take place being separated by quarters of period during which the current maintains a constant intensity (horizontal parts of the waveform). The graph (5b) is phase-shifted by a quarter period with regard to the graph (5a). Scanning currents such as those represented at (5a) and (5b) can be obtained by known devices, not forming part of the present invention.

The graph (5c) shows the output current from the photomultiplier tube 4 (FIG. 1) when the sighting mark and its optical image are in the rest position, that is to say when $x=y=\tan A_1=0$. The current of the tube varies therefore between 0 and the intensity $I_0$ with a period $T/2$.

The graph (5d) shows the modification of (5c) obtained when $a$, $b$, $c$, $d$ cease to be nil, as a result of a shift of the image. At this moment, the transitions from black to white or from white to black, instead of occurring at the instants $t_1$, $t_3$, $t_5$, $t_7$ occur at the instants $t'_1$, $t'_3$, $t'_5$, $t'_7$ shifted by $(aT/8)$, $(bT/8)$, $(cT/8)$ or $(dT/8)$ respectively with regard to the previous ones. Here, for simplification, one has assumed arbitrarily that $a$, $b$, $c$, $d$ are all positive, but this is by no way a necessary condition; the signs of $a$, $b$, $c$, $d$, can be arbitary ones provided that the relation (4) remains valid.

In order to extract from the sequence of signals represented in the graph (5d) voltages proportional to the quantities $(1+a)$, $(1+b)$, $(1+c)$, $(1+d)$, one proceeds in the following manner:

From the scanning source 5 of FIG. 1, four electrical sampling voltages of period T whose waveform is represented by the graph (5e) of FIG. 5 are derived; these voltages are zero during three quarters of the period T and assume the value 1 for a duration $T/4$. In FIG. 5 only that of these voltages which corresponds to the formation of a signal proportional to $(1+a)$ is shown. The other sampling voltages, not shown in FIG. 5, have the same waveform as that shown in (5e), but are phase-shifted with regard to this latter by one quarter, two quarters, and three quarters of the period T respectively.

It can immediately be seen that a logical circuit such as and "AND"-gate comprised in the comparator 8 (FIG. 1) to the inputs of which are applied the signals represented at (5d) and (5e), these latter being obtained through the connection 9 from the source 5, delivers at its output a signal having the waveform shown in (5f), with a constant amplitude $A_0$ and a duration $(t'_1-t_0)$. The integration with respect to time of this signal gives a voltage of amplitude $V_a$ proportional to $(1+a)$, which is stored and returned to zero at the end of each period T by a short pulse also derived from the source 5, of FIG. 1. The waveform of the integrated signal is represented at (5g) and the maximum amplitude of this signal is stored during the greater part of the period T.

The voltage of amplitude $V_d$ proportional to $(1+d)$ can be obtained by similar means, by using a sampling voltage of same waveform as that shown at (5e), but taking the value 1 between the instants $t_6$ and $t_8$.

A slightly different procedure has to be applied in order to obtain the voltages $V_b$ and $V_c$ respectively proportional to $(1+b)$ and $(1+c)$, that is to say to $(t_4-t'_3)$ and $(t_6-t'_5)$. By comparing the graphs (5d) and (5g), it easily seen that each of the voltages $V_b$ and $V_c$ can be obtained by the application to an "OR exclusive" circuit of the signal (5d) and of a sampling voltage of the same waveform shown in (5e), but having its unit amplitude partly between $t_2$ and $t_4$ for $V_b$ or between $t_4$ and $t_6$ for $V_c$, respectively. Of course, there exists a great number of embodiments of logical circuits able to supply the same results, that is to say the obtaining of the voltages $V_a$, $V_b$, $V_c$, $V_d$, from the signal (5d) of FIG. 5 and sampling voltages such as (5e) (FIG. 5) suitably phase-shifted. One can for example conceive such circuits employing "NAND" gates. In this respect it must be pointed out that the voltages (5e) can be easily obtained from the derivatives with regard to time of the scanning currents (5a) and (5b), or else from these derivatives changed in sign. It is therefore easy to obtain them from the scanning source 5.

Having obtained the voltages $V_a$, $V_b$, $V_c$, $V_d$ of respective amplitudes $V_0(1+a)$, $V_0(1+b)$, $V_0(1+c)$, $V_0(1+d)$ where $V_0$ is a constant voltage, it is now a question of deriving therefrom the values of $(x/l)$, $(y/l)$, tan $A_1$. To this end, three of the said voltages (since their values are not independent, by virtue of the relation (4) above) are applied to three corresponding inputs of the analog computer represented in FIG. 6. This computer is comprised in the comparator-computer 8 of FIG. 1; a constant voltage of amplitude $(-V_0)$ is also applied to this computer.

Figure 6:
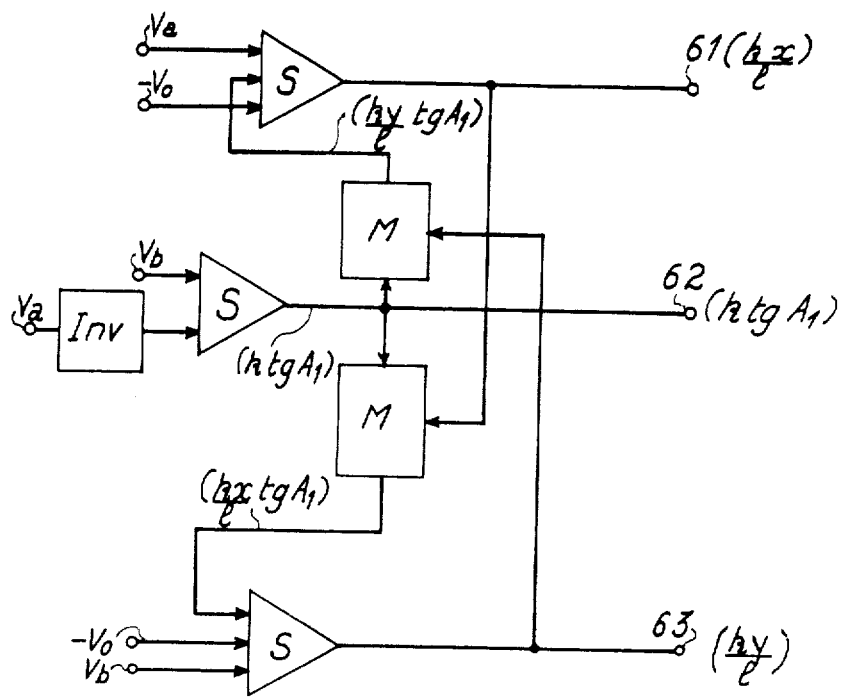
FIG. 6 is a block diagram of a simple analog computer allowing one to obtain, from the waveforms of FIG. 5, the values of the parameters characterizing the shaft.

In FIG. 6, the circuits marked S are adders, the circuits marked M are multipliers, and the circuit marked INV is an inverter. One also sees in FIG. 6 a polarity reversal circuit INV. It is easy to check that the computer of FIG. 6 supplies from the voltages $V_a$, $V_b$, $V_c$ and $-V_0$ the quantities $x/l$, $y/l$ and tan $A_1$ or, more precisely voltages proportional to these quantities with a proportionality constant $k$. The input voltages are applied to the input terminals as indicated in FIG. 6 and the output voltages $kx/l$, $ky/l$, $k$ tan $A_1$ are obtained at output terminals 61, 62, 63 respectively. Of course one can imagine other analog computers supplying the same results from any three distinct ones of the four quantities $V_a$, $V_b$, $V_c$, $V_d$.

The application of the above-mentioned means to the determination of the shifts of a solid body having six degrees of freedom, for example an aerodynamic model kept in magnetic suspension by known means in a test tunnel in which flows an air current, will now be briefly described. Electrical measurements of the shifts then serve to control a magnetic suspension servomechanism which allows the forces and torques necessary for restoring the model to its rest position to be applied thereto.

Referring to FIG. 7 the model 71 is hung up magnetically, by means not shown here, in the envelope 72 of a test tunnel of axis $X_0$. The model 71 is capable of undergoing shifts with regard to three fixed rectangular axes $X_0$, $Y_0$, $Z_0$ which normally intersect at a point inside this model. In the rest position of the model, the axes $Y_0$ and $Z_0$ pass through the centers of three sighting marks 73, 74, 75 carried by the surface of 71. Sighting mark 73 is associated with line of sight $Y_0$ and sighting marks 74 and 75 are respectively associated with the lines of sight $Z_0$ and $-Z_0$. To each of said lines of sight is associated an object respectively 81, 83, 85 and a phototube unit, respectively 82, 84, 86. Units 82, 84, 86 include scanning means, comparators and computers such as the members 5, 6, 7, 8 of FIG. 1.

In the rest position of model 71, the planes of the sighting marks 73, 74, 75 (or else the plane tangent to the latter, if their surface is curved) are substantially perpendicular to the corresponding axes $Y_0$, $Z_0$, $(-Z_0)$. The shift angles of 71 relatively to its rest position being assumed to be small, the cosines of these angles remain, in operation, close to unity. Consequently the new displaced positions of the sighting marks 73, 74, 75 are very close to those they would respectively assume through translations $(x_1y_1)$ $(x_2y_2)$ $(x_3y_3)$ in the above-defined rest planes, and through respective rotations of angles $A_1$, $A_2$, $A_3$ in these same planes.

This being granted, when the model is displaced from its rest position, calculating members similar to that of FIG. 6, respectively associated with the axes $Y_0$, $Z_0$, $(-Z_0)$ deliver the corresponding values of the quantities $(x_1y_1)$, $(x_2y_2)$ $(x_3y_3)$ and $A_1$, $A_2$, $A_3$. Through known calculation means, which do not form part of the present invention, it is possible to derive from the preceding quantities, which in fact are not independent, the values of the elements of any selected group of six parameters expressing in the form of electrical signals the shift of 71 with respect to its rest position. These latter signals can, if need be, be injected into the feedback loop of a servo system acting on the currents flowing through the coils ensuring the magnetic suspension of the model, coils which are normally housed in the thickness of the envelope 72.

The principal advantage of the invention resides in that the system, in the application represented by FIG. 7, does not involve any electrical interaction between the magnetic suspension servo-mechanism and the measuring devices, and that it is not any longer necessary to provide corrections which are functions of the shape or of the volume of the solid object of which the shift or the properties of interaction with a fluid current are investigated.

Still in this same application, the system of the invention offers the advantage that it does not comprise elements encumbering the free space existing between the envelope 72 and the object 71 in the wind-tunnel.

What is claimed is:

1. Apparatus for the distant measuring of the displacement about a fixed reference position of a solid object carrying at least one optical sighting mark having alternate light portions and dark portions angularly distributed around a main sighting axis, comprising:

a plurality of opto-electronic devices, each having a main sighting axis corresponding to said fixed reference position;

optical means forming the optical image of said sighting mark on the photocathode of a photomultiplier tube;

said tube comprising means for transforming said optical image into an electronic image, said tube projecting an electron flux onto a conductive target located in a plane substantially perpendicular to said main axis providing a scanning periodic motion along a closed rectangular curve around the main axis wherein the electrical signals are proportional to the time derivative of the current passing through the aperture in the target during each scanning period;

said tube including an aperture in said target capable of letting a thin electron beam pass therethrough;

scanning means controlled by a periodic sweep current source for periodically causing said target to be scanned by said electron flux along a predetermined closed path around said axis;

amplifying means for amplifying the current of said thin electron beam and deriving therefrom electric signals proportional to the time derivative of said current and the times of occurrences of said signals corresponding to the passing of the closed rectangular curve from a light to a dark portion or vice versa; and, comparator and computer means for processing and combining said electric signals with periodic signals from said source to obtain further electric signals representing the components of said displacement in a coordinate system having the main axes of said devices as reference axes.

2. Apparatus as claimed in claim 1, in which said main axes from a three-dimensional rectangular coordinate system and in which said path is a rectangle.

3. Apparatus as claimed in claim 1, in which said scanning means consist of two coils supplying orthogonal magnetic fields, each of said coils being successively fed during each one of the successive fourths of a scanning period, and the current in each one of said coils firstly increasing linearly in time from a minimum value to a maximum value, secondly remaining at said maximum value and thirdly decreasing linearly in time to said minimum value, and finally remaining constant at said minimum value, said two coils being respectively fed from said source by currents staggered in time with respect to each other by a fourth of said period.

4. Apparatus as claimed in claim 1, in which said object carries three sighting marks respectively cooperating with three of said devices and in which said electric signals supplied by said devices are combined in a computer which delivers said further signals representing said components, and in which said further signals control a servomechanism bringing back said object to said fixed position.

References Cited

UNITED STATES PATENTS

| 2,892,949 | 6/1959 | Hardy | 250—203 CTS |
| 3,515,877 | 6/1970 | Baxter et al. | 250—200 |
| 3,480,908 | 11/1969 | Codina | 340—17 |

FOREIGN PATENTS

| 1,501,457 | 11/1966 | France | 89—41 |

BENJAMIN A. BORCHELT, Primary Examiner

S. C. BUCZINSKI, Assistant Examiner

U.S. Cl. X.R.

250—207, 203 CTS; 318—640; 356—138, 150